Aug. 9, 1932.         O. COVER         1,870,282
OIL TESTING DEVICE
Filed July 10, 1926
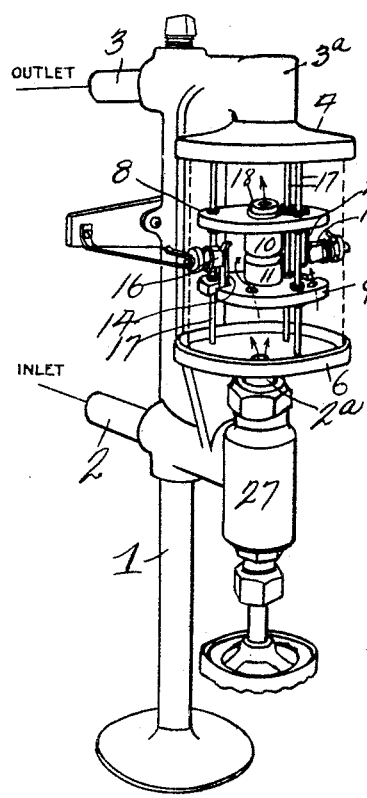
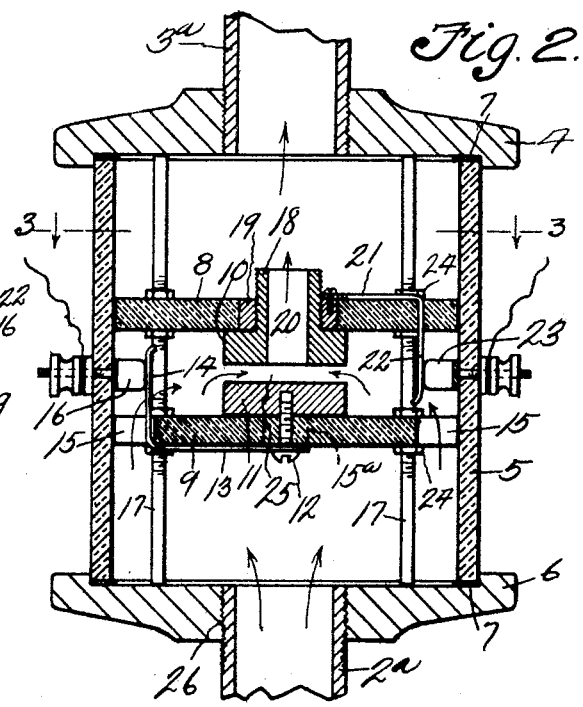
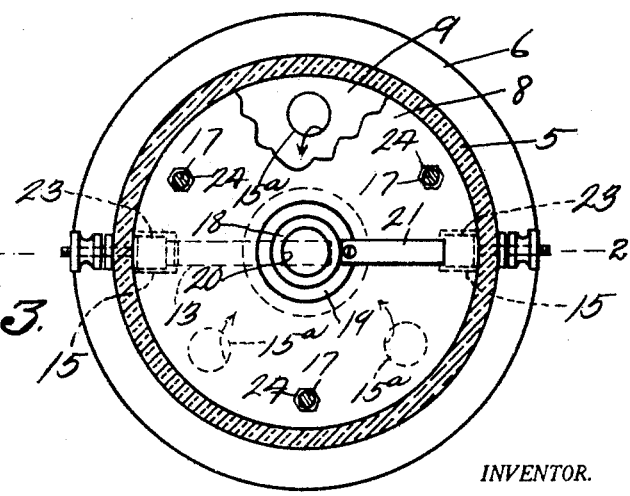
INVENTOR.
BY Owen Cover.
George J. Ottsch
ATTORNEY.

Patented Aug. 9, 1932

1,870,282

UNITED STATES PATENT OFFICE

OWEN COVER, OF GOSHEN, INDIANA

OIL TESTING DEVICE

Application filed July 10, 1926. Serial No. 121,594.

The invention relates to oil testing devices, and has for its object to provide a device of this character through which a continuous stream of oil may be forced to pass between spaced electrodes, and by means of which device the dielectric properties of the oil may be tested. The device is particularly adapted for use in testing oil in transformers, circuit breakers, electrolytic arresters and feeder regulators, wherein insulating oil is used, and which oil is tested from time to time as to its dielectric properties.

A further object is to provide an oil testing device comprising spaced electrodes between which the oil passes inwardly and is discharged through a port in one of said electrodes thereby insuring the passage of all the liquid between the electrodes for subjecting all of said liquid to the dielectric test.

A further object is to provide an oil testing device comprising a casing preferably formed of glass and in which casing is disposed spaced discs formed from insulating material and the adjacent sides of said discs with electrodes in spaced relation, and one of said discs with oil passages therethrough for allowing passage of oil between the discs and electrodes in its passage to the discharge port through one of the electrodes.

A further object is to mount the discs on supporting rods, and to provide means whereby the discs may be varied in relation to each other. Also to adjustably mount one of the electrodes whereby it may be adjusted at various distances from the other electrode for varying the gap.

A further object is to provide the discs with spring contact arms engaging contact members carried by the casing and forming means whereby the circuit will be maintained when the discs are adjusted at various positions. Also to locate the oil passages through one of the discs in registration with the casing contact members whereby the discs and their supporting rods may be removed from the casing as a unit when desired.

With the above and other objects in view the invention resides in the combination and arrangement of parts as hereinafter set forth, shown in the drawing described and claimed, it being understood that changes in the precise embodiment of the invention may be made within the scope of what is claimed without departing from the spirit of the invention.

In the drawing:—

Figure 1 is a perspective view of the oil testing device.

Figure 2 is a vertical transverse sectional view through the oil testing device, taken on line 2—2 of Figure 3.

Figure 3 is a horizontal sectional view taken on line 3—3 of Figure 2.

Referring to the drawing, the numeral 1 designates a support, 2 an inlet pipe extending horizontally through said support and 3 an outlet pipe extending through the support adjacent its upper end. Threaded on the downwardly extending portion 3a of the outlet pipe 3 is a cap 4, which cap engages the upper end of the cylindrical glass casing 5 of the device, which glass casing is disposed above the flange 6 threaded on the inlet pipe portion 2a, and interposed between the ends of the glass cylindrical casing 5 are packing members 7, which when the flanges 4 and 6 are in close engagement therewith prevent escape of oil from the chamber of the casing 5. It is the present practice to take samples of oil from electrical apparatus for testing purposes, however this is not a true test of the entire bulk of oil as there is no assurance that the oil is equally mixed throughout its entire bulk, and in the present device the entire bulk of oil is passed through the device for testing purposes in a manner whereby all the oil is submitted to the dielectric test. If so desired the device may be attached to the electric apparatus whereby the oil as it is drawn from the apparatus is tested and replaced in the apparatus, however applicant does not limit himself in this respect.

Disposed within the chamber of the casing 5 are spaced discs 8 and 9, which discs are formed from insulating material, and provided with electrodes 10 and 11. The electrode 11 is carried by the disc 9 and is held thereon by means of a screw 12 and connected to the screw 12 is a conductor member 13, which member extends outwardly and terminates in an upwardly extending arm 14, which extends through one of the recesses 15 in the disc 9. Arm 14 engages the contact member 16 carried by one side of the casing 5, and it will be seen when the discs 8 and 9 are adjusted towards and away from each other on the supporting rods 17, the contact will be maintained with the contact member 16. Electrode 10 is provided with a screw extension 18, which is threaded through a bushing 19 in the disc 8, and also with an axially disposed discharge port 20, through which the oil passes in its passage through the device. The conductor member 21 is connected to the bushing 19 and terminates in a downwardly extending arm 22 which engages the contact member 23 in a manner similar to the engagement of the contact arm 14, therefore it will be seen that both discs may be adjusted without breaking the circuit. By providing the recesses 15 in the disc 9 it will be seen that the interior parts of the device may be removed and replaced without disassembling the same and by simply moving the interior assembly to a position where the contact members 16 and 23 will register with the recesses 15 and at which time the parts can be easily removed or replaced as a single unit. Discs 8 and 9 are adjustably mounted on the rods 17 and held in adjusted positions by means of the nuts 24 which engage opposite sides of the discs. The electrodes 10 and 11 are in registration and it will be seen that by providing the threaded extension 18 on the electrode 10, said electrode 10 may be accurately adjusted to form the desired spark gap 25. In operation the oil passes upwardly through the pipe 2a and thence through the recesses 15 and apertures 15a in the disc 9, and thence inwardly from all sides towards the axis of the device and between the electrodes 10 and 11, which have been previously adjusted for the desired dielectric test. The oil then passes upwardly through the port 20 in the electrode 10 and into the upper end of the chamber of the casing 5, and from which chamber end it is discharged through the pipe 3a and outlet pipe 3 to any suitable source of discharge, for instance back into the electrical apparatus from which it has been drawn through the pipe 2, that is, where the device is used in connection with the electrical device. It will be noted that as the oil is passed through the device all of it is exposed to the dielectric test.

It will be noted that the flange 6 is threaded at 26 on the pipe 2a, and by screwing said flange 6 downwardly on the pipe 2a, the cylinder 5 as well as the parts therein can be easily removed from the device for repair, cleaning or adjustment purposes. The inlet pipe 2 is preferably provided with a valve 27, and by means of which valve the flow of oil through the device may be controlled.

From the above it will be seen that an oil testing device is provided which is simple in construction, the parts reduced to a minimum and that a continuous flow of oil can be passed through the device and tested, thereby obviating the present unsatisfactory practice of testing a quantity of oil by testing samples therefrom.

The invention having been set forth what is claimed as new and useful is:—

1. An oil testing device comprising a casing, upper and lower discs in said casing in spaced relation to each other and between which oil passes through ports in the lower disc, electrodes carried by said discs and between which the oil passes to a discharge port in the electrode of the upper disc, rods within the casing and extending through the discs, means for adjusting the position of the discs on the rods, contact members carried by the casing in registration with recesses in the lower disc, and spring conductor arms carried by the discs and connected to the electrodes and having sliding engagement with the contact members of the casing.

2. A high potential oil testing device comprising a casing, spaced discs within said casing, intake ports through one of said discs, electrodes carried by said discs in spaced relation to each other, supporting means for the discs, a discharge port carried by one of said electrodes, means for adjusting said electrodes in relation to each other, means for adjusting said discs in relation to each other, conductor members carried by the electrodes, contact members, said conductor members having sliding engagement with said contact members.

3. An oil testing device comprising a casing, upper and lower partitions mounted in said casing in spaced adjustable relation to each other, electrodes carried by said partitions and between which oil passes from ports in one partition to a discharge port in the electrode carried by the other partition, contact members carried by said casing, and spring conductor arms carried by said electrodes and having sliding engagement with said contact members.

4. An oil testing device comprising a casing, spaced partitions disposed in said casing, electrodes carried by said partitions in spaced adjustable relation, contact members carried by said casing, spring conductor arms carried by said electrodes and having sliding engagement with said contact members, and members mounting said partitions whereby said partitions, electrodes and conductor arms are removable from said casing in a unit.

5. An oil testing device comprising a casing, spaced partitions in said casing, registering electrodes carried by said partitions, one of said partitions having ports formed therein spaced from the electrode carried thereby, the electrode carried by the other partition having a port extending centrally therethrough, said electrodes being adjustable relative to each other, and a member mounting said partitions whereby said partitions and electrodes may be removed from said casing as a unit.

6. An oil testing device comprising a casing, spaced partitions in said casing, parallel registering electrodes carried by said partitions, the oil passing from ports formed in one partition to a port formed centrally in the other partition and electrode, and members adjustably mounting said partitions.

7. An oil testing device comprising a casing, spaced partitions in said casing, parallel registering electrodes carried by said partitions, the oil passing from ports formed in one partition to a port formed centrally in the other partition and electrode, members adjustably mounting said partitions, contact members carried by said casing, and conductor arms having sliding engagement with said contact members.

8. An oil testing device comprising a casing, spaced electrodes, contact members carried by said casing, conductor arms carried by said electrodes and having sliding engagement with said contact members, and members adjustably mounting said electrodes whereby said electrodes and conductor arms are removable from said casing as a unit.

9. An oil testing device comprising a casing having an intake and outlet, spaced partitions in said casing, rods adjustably mounting said partitions in said casing, and spaced electrodes carried by said partitions and being adjustable relative to each other, said partitions and electrodes being so formed that all of the oil passing from said intake to said outlet must pass between said electrodes.

10. An oil testing device comprising a casing, spaced partitions mounted in said casing, electrodes carried by said partitions and being adjustable one relative to the other, contact members carried by said casing, and conductor arms having sliding engagement with said contact members.

11. An oil testing device comprising a casing, spaced electrodes disposed in said casing, contact members carried by said casing, and conductor arms carried by said electrodes and having sliding engagement with said contact members.

12. An oil testing device comprising a casing, spaced electrodes disposed in said casing, contact members carried by said casing, conductor arms carried by said electrodes and having sliding engagement with said contact members, and members mounting said electrodes and conductor arms whereby said electrodes and conductor arms are removable from said casing as a unit.

13. A device for testing the insulating properties of oil, comprising a casing, two electrodes located in said casing, said electrodes having opposed plane surfaces transverse to the general direction of oil-flow through said casing, one of said electrodes having through it a hole which communicates with the space between the electrodes so that at least part of any oil passing through said casing will pass through such hole and between the opposed surfaces of said electrodes, and means for imposing a predetermined potential difference on said electrodes.

14. A device for testing the insulating properties of oil, comprising a casing, two electrodes located in said casing, said electrodes having opposed plane surfaces transverse to the general direction of oil-flow through said casing, one of said electrodes having through it a hole which communicates with the space between the electrodes so that at least part of any oil passing through said casing will pass through such hole and between the opposed surfaces of said electrodes, means for adjusting the relative position of said electrodes to regulate the spacing of their opposed plane surfaces, and means for imposing a predetermined potential difference on said electrodes.

15. A device for testing the insulating properties of oil, comprising a casing, two electrodes located in said casing, said electrodes having opposed plane surfaces transverse to the general direction of oil-flow through said casing, one of said electrodes having through it a hole which communicates with the space between the electrodes, means for directing the flow of oil to said hole whereby all of the oil passes between the opposed surfaces of said electrodes, and means for imposing a predetermined potential difference on said electrodes.

16. A device for testing the insulating properties of oil, comprising a casing, two electrodes located in said casing, said electrodes having opposed plane surfaces transverse to the general direction of oil-flow through said casing, a partition dividing said casing and mounting one of said electrodes, said partition and the electrode carried thereby having a hole therethrough which communicates with the space between said electrodes whereby all the oil passes between the opposed surfaces of said electrodes, and means for imposing a predetermined potential difference on said electrodes.

17. A device for testing the insulating properties of oil, comprising a casing, two electrodes located in said casing, said electrodes having opposed plane surfaces transverse to the general direction of oil-flow through said casing, one of said electrodes having through it a hole which communicates with the space between the electrodes so that at least part of any oil passing through said casing will pass through such hole and between the opposed surfaces of said electrodes, means mounting said electrodes whereby they may be removed from said casing as a unit, and means for imposing a predetermined potential difference on said electrodes.

In testimony whereof I affix my signature.

OWEN COVER.